United States Patent [19]

Panzeri

[11] 4,177,644
[45] Dec. 11, 1979

[54] APPARATUS FOR CONTROLLING AND TAKING UP AXIAL DISPLACEMENT IN MACHININGS ON LARGE DIAMETER CYLINDERS

[75] Inventor: Cesare Panzeri, Macherio, Italy

[73] Assignee: Breda Termomeccanica S.p.A., Milan, Italy

[21] Appl. No.: 877,733

[22] Filed: Feb. 14, 1978

[30] Foreign Application Priority Data

Feb. 15, 1977 [IT] Italy ................................ 20302 A/77

[51] Int. Cl.² ............................................ F01B 23/00
[52] U.S. Cl. ................................. 60/721; 60/DIG. 2; 92/161; 248/637
[58] Field of Search ........... 29/428; 74/813 R, 813 G; 92/161, 169; 248/2, 1; 60/721, DIG. 2

[56] References Cited

U.S. PATENT DOCUMENTS

| | | | |
|---|---|---|---|
| 2,789,594 | 4/1957 | Coleman | 248/2 |
| 3,206,663 | 9/1965 | Neal et al. | 318/28 |
| 3,346,807 | 10/1967 | Wood et al. | 324/37 |

Primary Examiner—Edgar W. Geoghegan
Attorney, Agent, or Firm—Fleit & Jacobson

[57] ABSTRACT

Apparatus for controlling and taking up the axial displacement of large rotating cylinders, comprising a pair of end bearings, of which one is provided with driven rollers, while the other is provided with idle rollers, one of which is carried by a bearing orientable about a vertical axis. A first transducer senses the axial displacement of the cylinder and its output is connected to an input to a first device effecting a comparison with a reference signal; the output of the first comparing device is connected through an amplifier to an input to a second comparing device, a second input of which is connected to the output of a second transducer sensing the displacement of the guide roller bearing. The output of the second comparing device controls a servoactuator mechanically connected to the orientable bearing of the guide roller.

9 Claims, 7 Drawing Figures

APPARATUS FOR CONTROLLING AND TAKING UP AXIAL DISPLACEMENT IN MACHININGS ON LARGE DIAMETER CYLINDERS

This invention relates to an apparatus for controlling and taking up axial displacement, hereinafter also referred to as "drift," during processings on large rotating cylinders, such as during welding, grinding, plating operations for the circumferential joint of large diameter cylinders having substantially thick walls, that are normally used for the construction of large containers, tanks and the like.

As well known, where circumferential processings on large hollow cylindrical bodies or "ferrules" are involved, the cylinder is rotatably driven and supported or its horizontal axis by end bearings, of which one is provided with a pair of driving rollers, and the other with a pair of idle rollers, one of which is orientable about a vertical axis for guiding said cylinder.

Thus, a large rotating cylinder, merely resting and rotatably driven by end rollers, due to unavoidable compliances, faults in alignment and planarity of supporting rollers, as well as ovality of the cylinder cross-section and changes in friction with the rollers, is subjected to a spinning motion causing an axial displacement of the cylinder as a whole. Such an axial displacement or "drift" has to be compensated for relative to an operating head to ensure that the circumferential machining is exactly carried out in the desired plane.

This axial displacement may be compensated for either by supporting the operating head so as to follow the cylinder displacement, or by taking up such an axial displacement by means of a control of "drift" motion consisting of the axial component of said spinning motion of the cylindrical body.

At present, use is made of operating heads or manipulators provided with position servomotors following the drift motion of the cylindrical body so as to nullify any relative axial displacement between said heads and cylindrical body. As apparent, should the displacement of the cylindrical body exceed a maximum allowed value, then such a displacement has to be taken up, but without any discontinuity in machining or work operation.

At present, take up of axial displacement for a rotating cylindrical body is effected by mechanical adjustment and orientation of one of the idle supporting rollers relative to the rotational plane of the cylindrical body. Such an adjustment is made by manually acting on a rack-and-pinion device angularly displacing a lever connected to the mounting of the guide roller.

Thus, known systems do not allow a control and continuous take up of the axial displacement of the roller and have a high degree of hazard since, in view of the substantial rotating masses, a possible excess or error in correction of the orientable roller may lead to the development of a force of axial thrust exceeding the limit of friction with the cylinder surface, with a resulting skidding and possible bouncing of the cylinder.

It is the object of the present invention to provide an apparatus of the above mentioned kind, which is capable of automatically providing a control and take up of the axial displacement of the rotating cylindrical body, enabling an angular correction for the guide roller constantly proportional to the error in position of the cylinder. Thus, the rotating cylindrical body constantly retains a balanced position, allowing for only slight displacements within a narrow range of predetermined values.

Generally, according to the invention, an apparatus is provided for controlling and taking up the axial displacement of large rotating cylinders, wherein with its horizontal axis the cylinder rests on a pair of end bearings, of which one pair is provided with driven rollers, and the other pair is provided with idle rollers, of which one is carried by a rotating support about an axis which is vertical and is orientable relative to the rotational plane of the cylinder, such an apparatus comprising a first transducer for sensing the axial displacement of the cylinder, the output of which is connected to the input of a first device comparing with a reference signal supplied to its other input, the output of said comparing device being operatively connected through an amplifier to the input of a second comparing device, a second input of which is connected to the output of a second transducer for the displacement of the support or bearing for the guide roller; the output of said second comparing device being connected to a servoactuator mechanically connected to the orientable support of the guide roller.

The above described apparatus operates according to a double adjusting ring allowing to effect an angular correction of the guide roller, which is always proportional to the error in position of the rotating cylinder by a constant of proportionality settable by an amplification and control unit. Therefore, the apparatus according to the invention is characterized over any other known system as to reliability and functionality, enabling the rotating cylinder "to find" a substantially steady balance position by slight displacements within a strictly defined range.

The use of a double adjusting ring for making a correction by continuously comparing it with the error in displacement of the cylinder, is significant and extremely advantageous over a system conceived with only one proportionl adjusting ring, since the latter would be of scanty stability and difficult, if not impossible, to set up, because in trying to corrct any error in position of the cylindrical body, during the permanency of this even slight error, there would be a continuous increase in the angle of correction of the guide roller without any limitation relative to the allowable limit rate for such a correction, whereby a risk of skidding would occur between the guide roller and said cylindrical body.

The apparatus according to the invention may be made by using servoactuators both of electrohydraulic type and electrical type, as hereinafter described.

By way of unrestrictive example, the invention will now be described with reference to the accompanying drawings, in which.

Figure 1:
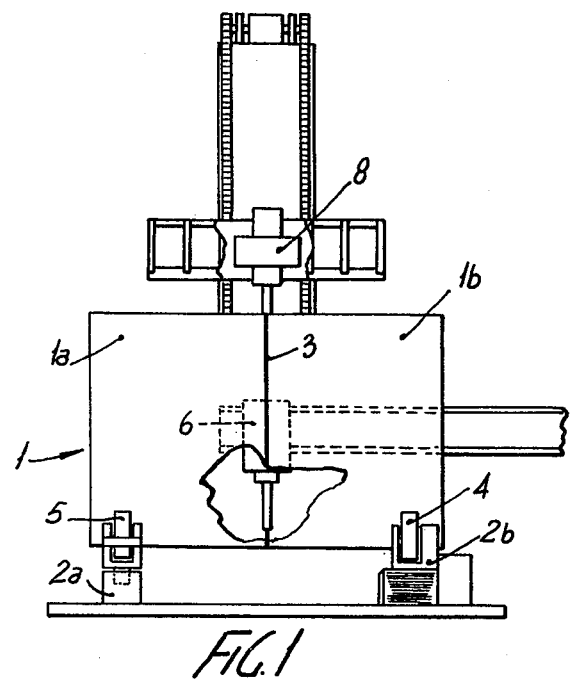
FIG. 1 is a front view showing an apparatus according to the invention for both internal and external circumferential machinings on cylinders having substantially thick walls and rotatably carried at horizontal position.
Figure 2:
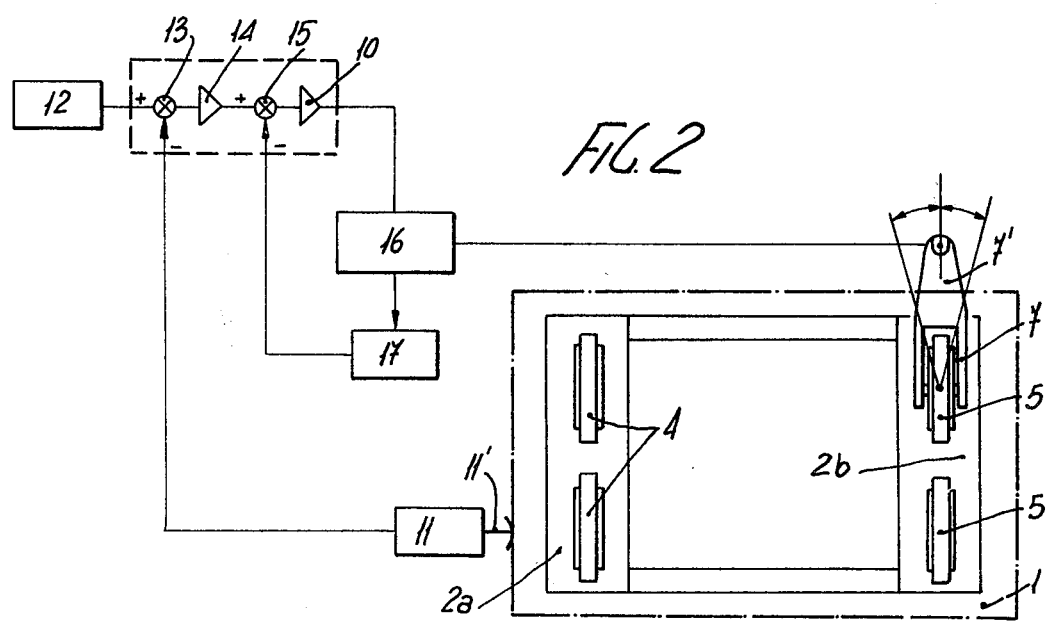
FIG. 2 is a diagrammatic view showing the general scheme of the apparatus controlling and taking up the axial displacement of the cylindrical body.

Referring to FIGS. 1 and 2 of the accompanying drawings, the scheme for the apparatus according to the invention and the general characteristics thereof will be described.

A cylindrical body 1 is shown in FIG. 1 as rotatably carried at horizontal position and about its longitudinal axis through a pair of bearings or end carriages 2a, 2b. Bearing 2a comprises two rollers 4 operated by a geared motor for rotatably driving said cylindrical body 1, while bearing 2b has a pair of idle rollers 5, one of which comprises the guide roller for said cylindrical body 1 and is carried by a support or mounting 7 orientable about a vertical axis by a member acting thereon, for example, a control level 7'.

In this particular case, cylindrical body 1 comprises two cylinders 1a, 1b having walls of a substantial thickness, on which, for example, circumferential work operations of inner and/or outer welding, grinding or plating have to be carried out at seam 3. Such operations can be made by suitable operating heads 6, 8, which are carried by a proper structure and are capable of moving along a vertical axis to follow or compensate for any ovalities in the circular cross-section of cylindrical body 1.

As shown in FIG. 2, the apparatus comprises a first transducer 11 which through a feeler member 11' allows for axial displacement of cylindrical body 1, converting the same into a corresponding electrical signal. The output of axial displacement transducer 11 is connected to an input of a first comparing device 13, forming part of an electronic control unit, schematically shown by a hatched rectangle in FIG. 2. The other input of comparing device 13 is connected to a device 12 for supplying a reference signal controlling the preset position of cylindrical body 1.

The output of said first comparing device 13, on which the difference appears between the input signals forming the position error signal of cylindrical body 1, is connected through an adjustable amplifier 14 to one input of a second comparing device 15, the output of which is in turn supplied to a servoactuator 16. This servoactuator 16, comprising for example a rotary or linear motor, operates lever 7' for controlling the bearing of guide roller 5. An amplifier 10 serves to adjust the response time, and a second transducer 17 perceives either directly or indirectly through servo actuator 16 the angular displacement of support 7 of the guide roller, providing a signal proportional to said displacement, which signal is fed to the other input of the aforesaid second comparing device 15. In brief the operation of the apparatus above shown is as follows: a reference signal from block 12 controls the predetermined position of cylindrical body 1 on bearings 2a, 2b. At the same time, displacement transducer 11 feels the end surface of cylindrical body 1, and locates the actual position of said cylindrical body 1. The difference between the reference position signal and the actual position signal for cylindrical body 1 (error signal), as conveniently amplified at 13 by a constant factor of correction, forms the correction signal controlling said servoactuator 16, the latter being effective on the bearing of guide roller 5, by differently orientating it to restore and hold cylindrical body 1 at said predetermined position. Said servoactuator 16 is loop controlled by the second displacement transducer 17, so as to impart characteristics of operating stability to the whole apparatus, avoiding that the permanency of even a slight error in position of cylinrical body 1 would unduly enhance the angle of correction for guide roller 5, exceeding a limit beyond which a dangerous skidding between said guide roller and rotating cylindrical body 1 would occur.

Figure 3:
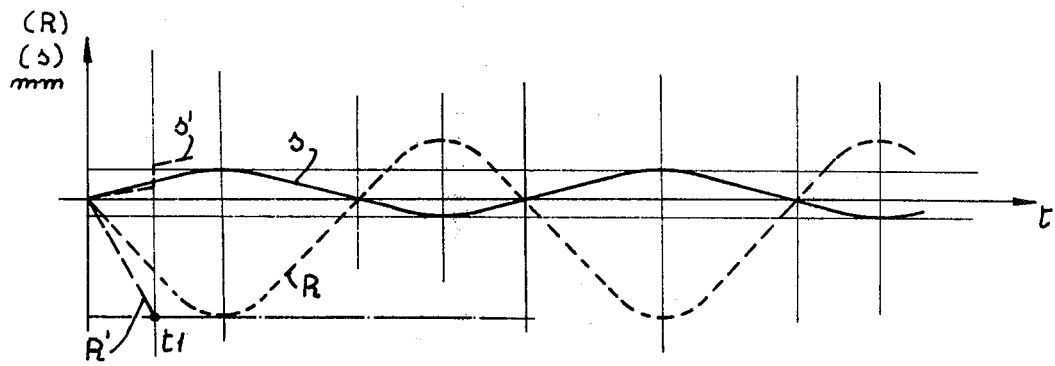
FIG. 3 is a graph or curve showing the diagram for the axial displacement of the cylinder and angular displacement of the guide roller, in time.

The operating conditions for the apparatus according to the invention are schematically shown in FIG. 3, wherein the diagram for displacement s of axis of cylinder 1, as given in millimeters, as indicated by full lines, whereas dashed lines R indicate the displacements for the bearing of guide roller 5, as amplified by a constant factor of correction, which is preselectable by regulating the amplification constant of amplifier 14. In FIG. 3, there is shown at R' the limit value for the displacement of said servoactuator, that is of the orientable bearing for the guide roller, beyond which a risk of skidding is likely to occur, as indicated at s' for instant t1.

Therefore, from FIG. 3 it will be seen that on suitably selecting the value of the correction factor, by a proper amplification of the error signal, the adjustment for the axial displacement of cylinder 1 can be maintained within a relatively narrow range of displacements. The apparatus operates so that an angle of correction according to said correction factor will continously and proportionally correspond to the axial shifting of cylindrical body 1.

In order to emphasize the character of generality for the apparatus controlling and taking up the axial displacement of large rotating cylinders, according to the invention some electrohydraulic or electrical type of embodiments will be hereinafter described with reference to the remaining figures of the accompanying drawings.

Figure 4:
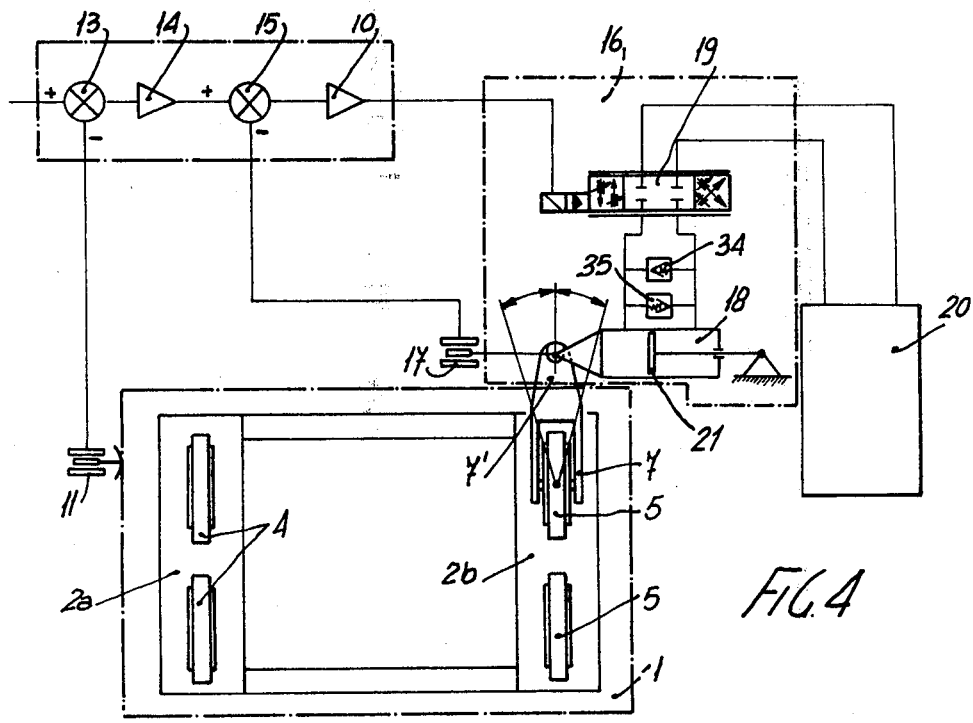
FIG. 4 is a view showing an electrohydraulic embodiment of the apparatus according to the invention.
Figure 5:
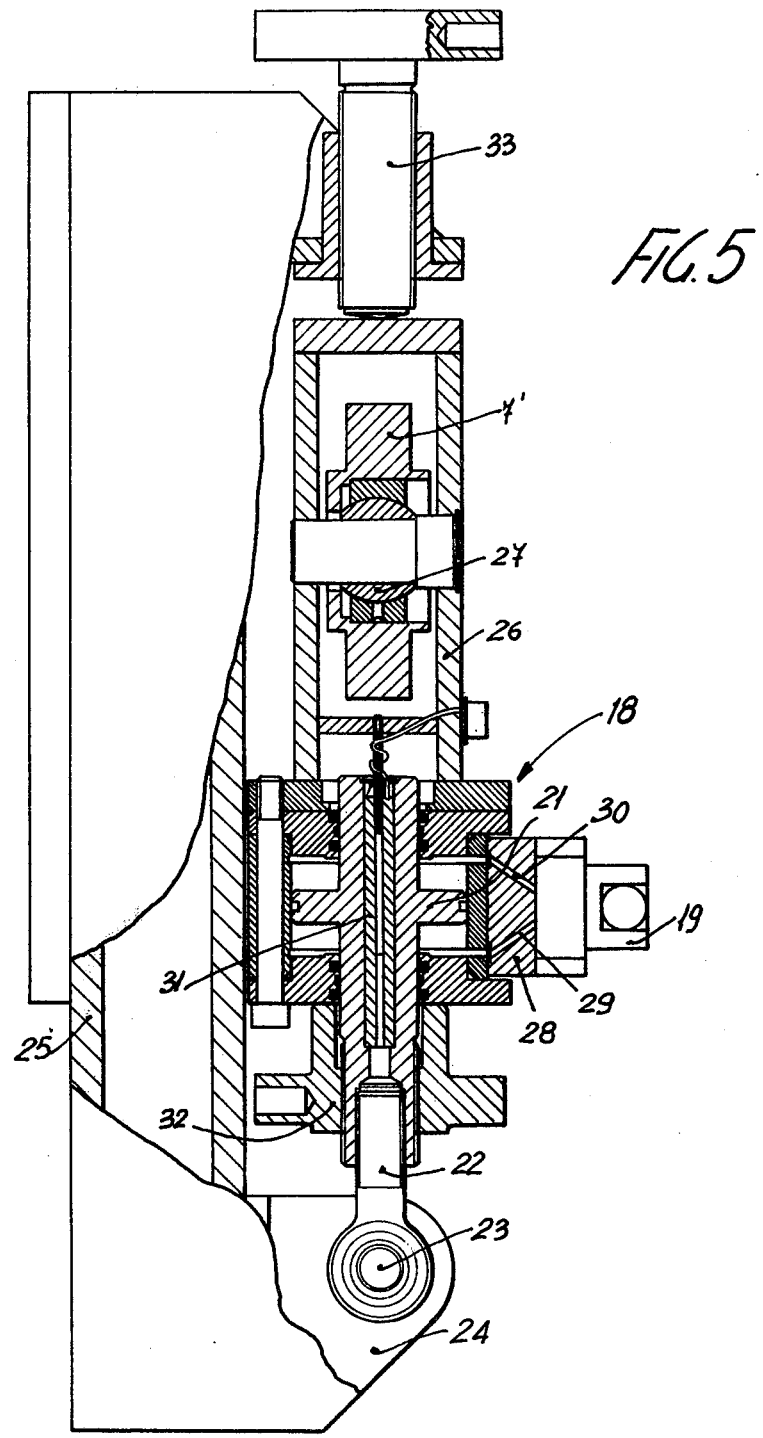
FIG. 5 is a view showing a preferred embodiment of the electrohydraulic servoactuator relating to the example shown in FIG. 4.

Referring to FIGS. 4 and 5, an electrohydraulic type of embodiment will now be described.

In the example shown in FIG. 4, the apparatus comprises an electrohydraulic type of servoactuator 16 including a double acting cylinder 18, the piston of which is suitably restrained through an articulation to a fixed location, whereas its casing is articulated to lever 7' of the support of the guide roller bearing 5. Cylinder 18 is positionally controlled by means of an electrohydraulic servovalve 19 supplied from an oleodynamic gearbox 20. This servovalve 19 is driven by the signal from said second comparing device 15, as above specified. Particularly, referring to FIG. 5, said double acting cylinder, designated as a whole at 18 in FIG. 4, comprises a piston 21 which, through stem 22 and orientable bearing 23, is restrained to a fork 24 of a stationary reaction structure 25.

In turn, casing 26 of said cylinder is connected to lever 7' for rotation of control or guide roller 5 through a second orientable bearing 27. The cylinder is supplied by servovalve 19 through distribution plate 28, in which supply ports 29 and 30, respectively, have been formed. The position control is carried out by means of an electronic displacement transducer 31 which, in the particular case being discussed, is coaxially housed within piston 21. This transducer 31 enables measurement of the relative displacement between the cylinder casing 26 and fixed piston 21. Two adjustable abutments 32, 33 enable limiting the stroke of cylinder 18, thus limiting the rotation of the guide roller bearing to an allowed maximum rate, thereby preventing the rotation of said guide roller from reaching or exceeding a value, at which skidding would occur.

Said abutments 32, 33 also enable control of the angular orientation of roller 5, should a failure occur in the automatic apparatus. This can be manually done through means of a suitable ratchet spanner on said abutments.

In order to avoid skidding between guide roller 5 and rotating cylindrical body 1, it is frequently required to limit the maximum force by which said servoactuator 16 acts upon the orientable bearing of said guide roller. In the case of the electrohydraulic actuator shown in FIG. 4, such a restriction is provided by a pair of extrapressure valves 34 and 35 arranged in opposite directions of flow therethrough and in parallel between the supply conduits for the pressure fluid on the two sides of cylinder 18.

Figure 6:
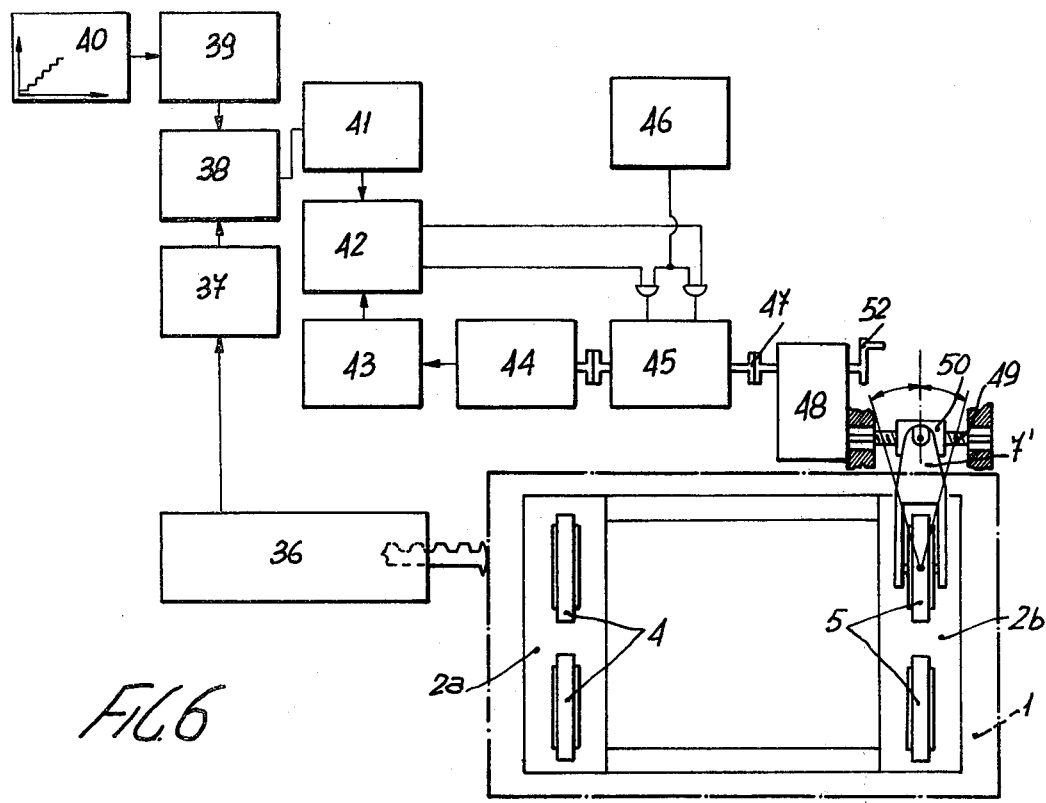
FIG. 6 is a view showing an electrical embodiment with stepping motor for the apparatus according to the invention.

FIG. 6 shows an embodiment for a digital type of the apparatus according to the invention, using an electrical actuator. In the scheme of FIG. 6, the axial displacement transducer, designated at 11 in FIG. 2, comprises an encoder 36 connected through an up and down counter 37 to an input of a comparing device, here comprising an adder 38, to the other input of which is connected a second up and down counter 39, and a preselector 40 for supplying a reference pulse or train of pulses at a normally low frequency set by means of a drive oscillator. The output of adder 38 is fed through an amplification unit 41 to an input of the second comparing device, here including a comparator 42, to the other input of which the signal from a third up and down counter 43 is supplied. This counter 43 is supplied by the signals from an encoder 44 mechanically connected to a stepping motor 45, the inputs of which are in turn supplied by signals from comparator 42 and controlled by an oscillator 46, which can be set to a frequency, for example, in the range of 10–300 Htz. The shaft of stepping motor 45 is further connected through a torque limiting coupling 47 and reduction gear 48 to a screw 49, having a nut screw 50 sliding thereon and articulated to control lever 7' for the orientable bearing of guide roller 5.

The stepping motor provides an angular position proportional to the set amount of steps at a speed proportional to the frequency of said steps. The stepping motor is suited for the particular application owing to its high zero rigidity.

The correction factor (ratio between the displacement of control lever 7' for the guide roller and the axial displacement of cylindrical body 1) is provided by means of a multiplicative constant or ratio constant of the number of pulses generated by encoder 44, which constant may be preset in block 41. Otherwise, the response rate may be electronically set by means of a potentiometer (not shown), controlling the frequency of the pulses supplied to stepping motor 45 by oscillator 46.

As above mentioned, cylindrical body 1 can be axially and suitably positioned by controlling successive slight displacements through position preselector device 40. In the particular case, said preselection can be normally made by a "Jog" pushbutton controlling only one pulse, or by a "Run" pushbutton controlling a train of pulses and at a normally low frequency.

Also in this particular case, the force can be restricted to avoid risk of skidding by interposing said torque limiting coupling 47 between stepping motor 45 and reduction gear 48, as previously specified. A manual operation is possible through a handwheel 52 or any ratchet spanner in case of failure in the automatic control apparatus.

Figure 7:
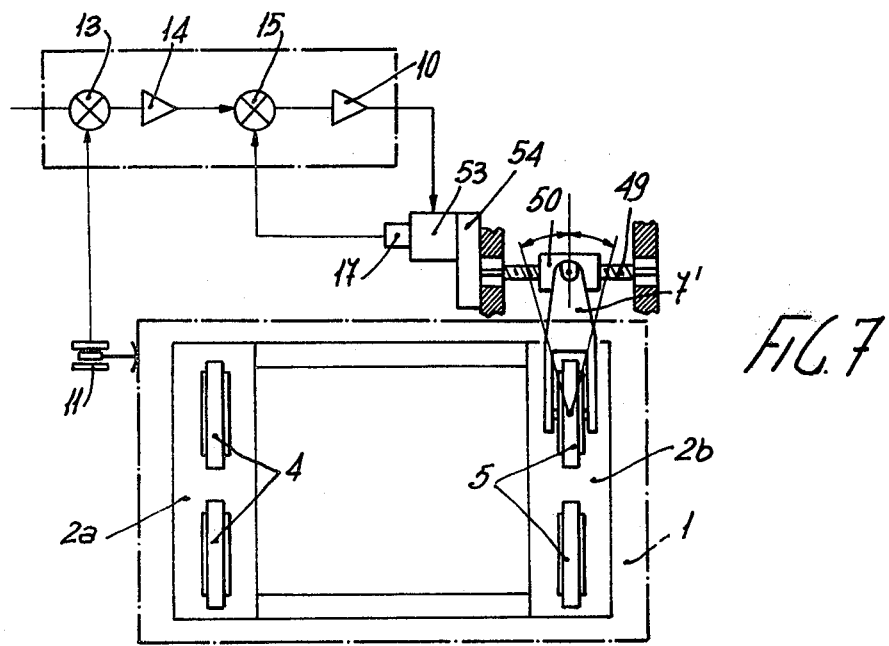
FIG. 7 is a view showing an electrical embodiment with a direct current motor for the apparatus according to the invention.

In FIG. 7, there is shown a final exemplary embodiment of the invention using an electric direct current motor 53, operating in the four "torque/speed" quadrants with current circulation zero control, and accordingly of a high static and dynamic rigidity. Motor 53 is still connected by a reduction gear 54 to a screw/nut screw couple 49, 50 connected to lever 7' of the control or guide roller 5, as in the preceding case or embodiment.

From the foregoing and as shown by the example of the accompanying drawings, it will be thus understood that an apparatus has been provided for controlling and taking up the axial displacement of large rotatably carried cylinders, on which internal and/or external circumferential work operations or machinings are carried out, which apparatus provides an angular correction for a guide roller of the rotating cylindrical body, which is always proportional to the error in position of said cylindrical body, in accordance with a constant of proportionality settable on said apparatus, the apparatus enabling holding the rotating cylindrical body 1 at a steady balance position with the slightest displacements from said position as the highest is the constant of amplification. Moreover, the inventive apparatus operates according to a double adjusting ring imparting a high accuracy and stability in operation. Finally, the use of adjustable mechanical limit stops, acting on the bearing of the guide roller or on said servoactuator, as in the case of FIG. 5, allow restriction of the rotation of said guide roller, maintaining the same below a limit safety value.

What is claimed is:

1. An apparatus for controlling and taking up the axial displacement of large rotating cylinders, wherein the cylinder rests on a pair of end bearings, of which one bearing is provided with driven rollers, while the other is provided with idle rollers, of which one is a guide roller carried by a bearing orientable about a vertical axis, comprising a first transducer for sensing the axial cylinder displacement, the output of which is connected to an input of a first device and compared with a reference signal supplied to another input to said first device, the output of the latter being operatively connected through an amplifier to an input of a second comparing device, a second input of which is connected to the output of a second displacement transducer for the bearing of the guide roller, the output of said second comparing device being supplied to a servoactuator mechanically connected to the orientable bearing of said guide roller.

2. An apparatus according to claim 1, wherein in the connection between said servoactuator and bearing of the guide roller, insertion is provided for a device limiting the maximum force acting on said bearing of the guide roller.

3. An apparatus according to claim 1, wherein the servoactuator is an electrohydraulic type of servoactuator and comprises a double acting cylinder articulated between a fixed location and a control lever for the orientable bearing of the guide roller, this cylinder being supplied by a servovalve electrically connected to an output of said second comparing device.

4. An apparatus according to claim 3, wherein between supply conduits of pressure fluid to said cylinder, two pressure limiting valves are branched off and arranged parallel to each other to permit flow therethrough in opposite directions.

5. An apparatus according to claim 3, wherein said second displacement transducer is coaxially incorporated within the piston of the double acting cylinder, and wherein on both sides of the latter manually adjustable mechanical abutments are provided.

6. An apparatus according to claim 1, wherein said servoactuator comprises a stepping motor, and wherein said first transducer comprises an encoder connected through an up and down counter to an adder, the output of which is in turn connected to the input of a comparator supplying said stepping motor, the second displacement transducer comprising a further encoder, operated by said stepping motor and connected to the input of an up and down counter, the output of which is in turn connected to a second input to said comparator.

7. An apparatus according to claim 1, wherein said servoactuator comprises an electric direct current motor operating in four torque-speed quadrants.

8. An apparatus according to claim 6, wherein said motor is connected to a screw/nut screw couple controlling an operating lever for the orientable bearing of the guide roller through a torque limiting coupling and a double inlet shaft reduction gear.

9. An apparatus according to claim 7, wherein said motor is connected to a screw/nut screw couple controlling an operating lever for the orientable bearing of the guide roller through a torque limiting coupling and a double inlet shaft reduction gear.

* * * * *